(12) United States Patent
Hallak et al.

(10) Patent No.: US 11,061,569 B2
(45) Date of Patent: Jul. 13, 2021

(54) METHOD AND SYSTEM FOR PROVIDING IMPROVED EFFICIENCY SNAPSHOTS USING SNAPLINES

(71) Applicant: Vast Data Ltd., Tel Aviv (IL)

(72) Inventors: Renen Hallak, Tenafly, NJ (US); Asaf Levy, Tel Aviv (IL); Avi Goren, Tel Aviv (IL); Vladimir Zdornov, Kfar Saba (IL)

(73) Assignee: Vast Data Ltd., Tel Aviv (IL)

( * ) Notice: Subject to any disclaimer, the term of this patent is extended or adjusted under 35 U.S.C. 154(b) by 194 days.

(21) Appl. No.: 16/241,124

(22) Filed: Jan. 7, 2019

(65) Prior Publication Data
US 2020/0218454 A1 Jul. 9, 2020

(51) Int. Cl.
*G06F 12/00* (2006.01)
*G06F 3/06* (2006.01)
*G06F 11/14* (2006.01)
*G06F 11/30* (2006.01)

(52) U.S. Cl.
CPC ............ *G06F 3/0608* (2013.01); *G06F 3/064* (2013.01); *G06F 3/067* (2013.01); *G06F 3/0631* (2013.01); *G06F 11/1407* (2013.01); *G06F 11/1451* (2013.01); *G06F 11/3034* (2013.01); *G06F 2201/835* (2013.01); *G06F 2201/84* (2013.01); *G06F 2201/88* (2013.01)

(58) Field of Classification Search
CPC ............... G06F 3/0608; G06F 11/1451; G06F 11/1407; G06F 3/0631; G06F 3/067; G06F 11/3034; G06F 3/064; G06F 2201/88; G06F 2201/84; G06F 2201/835; G06F 3/0619; G06F 3/065
USPC ........................................................ 711/162
See application file for complete search history.

(56) References Cited

U.S. PATENT DOCUMENTS

| 2017/0149890 | A1 | 5/2017 | Shamis et al. |
| 2020/0201814 | A1* | 6/2020 | Danilov .............. G06F 16/1734 |

\* cited by examiner

*Primary Examiner* — Mardochee Chery
(74) *Attorney, Agent, or Firm* — M&B IP Analysts, LLC.

(57) ABSTRACT

A system and method for efficiently providing snapshots in storage systems. The method includes creating a plurality of snaplines for a storage system, each snapline having metadata including a timestamp and a status marker for each of a plurality of offset ranges, wherein each offset range corresponds to data stored in the storage system, the storage system including a plurality of compute nodes, wherein the timestamp of each snapline is a value of a global counter at a time of creation of the snapline, wherein the global counter is uniform among the plurality of compute nodes; and creating a snapshot based on the plurality of snaplines and a time value, wherein the snapshot indicates a snapline of the plurality of snaplines that is not to be deleted, wherein the timestamp of the snapline that is not to be deleted corresponds to the time value.

19 Claims, 7 Drawing Sheets

METHOD AND SYSTEM FOR PROVIDING IMPROVED EFFICIENCY SNAPSHOTS USING SNAPLINES

TECHNICAL FIELD

The present disclosure relates generally to storage systems, and more particularly to providing snapshots of storage systems.

BACKGROUND

In data storage, a snapshot maintains the state of a portion of a storage system at a particular time. Historically, a snapshot is a read-only copy of a data set at a single time when the snapshot was taken and required large amounts of data to store point-in-time "pictures," i.e., full copies of data structures. As a result, the number of snapshots able to be taken and the performance of the system recording the snapshots have been limited. Specifically, creating a snapshot takes a relatively long time and requires pausing writing until the snapshot is completed. Additionally, snapshots must be created around the points-in-time they represent and new snapshots must be created each time a storage system is written to or deleted from if a record of all previous states are desired.

Some existing solutions provide space-efficient snapshots that typically involve using metadata structures pointing to old and new data without copying an entire set of data. Metadata pointers may be used to redirect to the relevant portion of storage when reading and writing. However, these solutions require a large number of metadata pointers. Thus, although storage capacity used by copies of actual data are reduced when using space-efficient snapshots, a significant amount of storage must still be dedicated to storing metadata.

Additionally, some existing snapshot solutions may be implemented on lower endurance storage drives (e.g., Flash drives). These solutions are designed for block storage and, therefore, can only create snapshots with respect to blocks.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for efficiently providing snapshots in storage systems. The method comprises: creating a plurality of snaplines for a storage system, each snapline having metadata including a timestamp and a status marker for each of a plurality of offset ranges, wherein each offset range corresponds to data stored in the storage system, the storage system including a plurality of compute nodes, wherein the timestamp of each snapline is a value of a global counter at a time of creation of the snapline, wherein the global counter is uniform among the plurality of compute nodes; and creating a snapshot based on the plurality of snaplines and a time value, wherein the snapshot indicates a snapline of the plurality of snaplines that is not to be deleted, wherein the timestamp of the snapline that is not to be deleted corresponds to the time value.

Certain embodiments disclosed herein also include a non-transitory computer readable medium having stored thereon causing a processing circuitry to execute a process, the process comprising: creating a plurality of snaplines for a storage system, each snapline having metadata including a timestamp and a status marker for each of a plurality of offset ranges, wherein each offset range corresponds to data stored in the storage system, the storage system including a plurality of compute nodes, wherein the timestamp of each snapline is a value of a global counter at a time of creation of the snapline, wherein the global counter is uniform among the plurality of compute nodes; and creating a snapshot based on the plurality of snaplines and a time value, wherein the snapshot indicates a snapline of the plurality of snaplines that is not to be deleted, wherein the timestamp of the snapline that is not to be deleted corresponds to the time value.

Certain embodiments disclosed herein also include a system for efficiently providing snapshots in storage systems. The system comprises: a processing circuitry; and a memory, the memory containing instructions that, when executed by the processing circuitry, configure the system to: create a plurality of snaplines for a storage system, each snapline having metadata including a timestamp and a status marker for each of a plurality of offset ranges, wherein each offset range corresponds to data stored in the storage system, the storage system including a plurality of compute nodes, wherein the timestamp of each snapline is a value of a global counter at a time of creation of the snapline, wherein the global counter is uniform among the plurality of compute nodes; and create a snapshot based on the plurality of snaplines and a time value, wherein the snapshot indicates a snapline of the plurality of snaplines that is not to be deleted, wherein the timestamp of the snapline that is not to be deleted corresponds to the time value.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing improved efficiency snapshots. In an embodiment, a storage system maintains snaplines that represent a state of metadata in a storage system at a point in time. At least a portion of the metadata is mapped (e.g., indirectly via other metadata) to data in the storage system such that the metadata acts as pointers to data stored in the storage system. The snaplines are organized sequentially with respect to a global time counter that increases over time.

The snaplines are implemented to provide snapshot consistency by ensuring that each dependent first write that depends on a second write is not included in a snapline unless the second write which it depends from is also included in the snapline. To this end, in an embodiment, a prefix tree of metadata directly involved in snapshot creation is maintained. The prefix tree indicates relationships among historical portions of metadata in the storage system such that dependencies among writes may be ensured by comparing prefixes. In another embodiment, compute nodes (i.e., nodes configured to perform data storage operations with respect to the storage system) may be instructed to stop answering writes via write acknowledgment until a new snapline has been created. This ensures that no writes that are depended upon by other writes in a snapline are excluded from the snapline. A first write is dependent on a second write when the times of writing of the writes do not overlap while two writes are independent when their times of writing overlap.

The snaplines are written to bitmap data structures including snaplines and metadata indicating corresponding offset ranges of data in the storage system. In an example implementation, the bitmap data structures are bitmap blocks including timestamps, data identifiers, and pointers. Each offset range of data in the storage system may be represented by a set including one or more bitmap data structures. The offset ranges and bitmap data structures may be adjusted dynamically to grow with the size of data actually written to the storage system rather than sizes of data structures used to store such data.

A snapshot for a target time is created based on the snaplines and the data saved at the corresponding offset ranges stored in the bitmap blocks. Each snapshot is a readable clone representing data in the storage system at a particular offset range and time and indicates a snapline that is not to be deleted. The snaplines and, therefore, the snapshots, reference metadata in the filesystem without copying the entire set of metadata. Accordingly, snapshots created as described herein require less storage capacity than existing snapshot techniques that duplicate entire sets of data or metadata.

The disclosed embodiments further include techniques for providing crash consistency when utilizing snaplines as described herein. To this end, in an embodiment, a prefix tree is maintained and used to ensure proper dependencies among writes. Each element in the storage system may be assigned a prefix identifier derived from its ancestors, i.e., other elements that were already in the storage system when the element was created or modified. The prefix identifiers may be assigned such that the identifier is longer depending on the depth of the element within an element tree of the storage system. Relationships among elements in the element tree may be confirmed by performing comparisons among prefix identifiers. Thus, to detect if an element is part of a snapshot, a prefix search within the tree is performed. The prefix identifiers may further be used to provide snapshots on portions of a storage system rather than on the entire system. To this end, prefix identifiers for the storage system are used to determine elements are included in a snapshot.

In another embodiment, crash consistency may be provided by pausing write acknowledgments from nodes in a distributed storage system when creation of a new snapline begins and resume when creation of the new snapline is created. Any writes that were not acknowledged at the time of beginning of creation of the new snapline are excluded from the new snapline so as to ensure that snapshots created based on the snaplines do not include dependent writes without their corresponding dependencies.

Implementations of the disclosed embodiments provide various operations for interacting with snaplines. In an example implementation, such operations may include operations for creating snaplines, erasing snaplines, writing to snaplines, reading from snaplines, and taking snapshots from snaplines.

The disclosed embodiments provide snapshots that are both space-efficient and metadata space-efficient. Also, writing to and reading from snapshots created according to the disclosed embodiments may be performed normally as compared to reading and writing other types of data to a storage. In particular, snapshots may be modified (e.g., by appending data) instead of rewritten entirely using a snapline index, reading snapshots does not require metadata scanning, and deletions of snaplines are proportional to the amount of data in the snaplines that need to be deleted rather than based on a static size of each snapshot. As a result, the disclosed embodiments reduce or eliminate performance penalties associated with creating snapshots as compared to writing other types of data.

The disclosed embodiments allow for modifying (i.e., via appending) snapshots rather than overwriting over them which, in turn, allows for reducing frequency of overwriting. As a result, the lifespans of any storage devices to which the snapshots are stored may be preserved. Additionally, the disclosed embodiments do not require writing and copying of data stored in the storage system. Thus, the disclosed embodiments allow for more effective use of low endurance storages such as, but not limited to, Flash drives.

Further, the disclosed embodiments may be used to create snapshots with respect to different types of data structures. For example, snapshots can be created for objects, buckets, files, directories, and other portions of filesystems.

Additionally, various disclosed embodiments allow for creating snapshots in hindsight based on previous states of filesystems. Thus, the snapshots may be reconstructed afterthe-fact, i.e., after the contents of the filesystem have changed. Further, since snapshots may be reconstructed, the frequency of recording of snapshots may be reduced as compared to existing solutions. For example, snapshots may be created only when needed by reconstructing the state of a storage system when a request for a snapshot is received rather than requiring snapshots be taken periodically. Further, since snapshots may be reconstructed and stored as needed rather than requiring all relevant snapshots be stored in advance, the disclosed embodiments allow for effectively providing a much larger set of snapshots relative to the amount of storage space that must be dedicated to storing copies of data and metadata.

To this end, it has been identified that existing solutions for creating and maintaining snapshots utilize excessive amounts of computing resources. Specifically, existing snapshot solutions create snapshots which take up a relatively large portion of storage, that take a relatively long amount of time to be recorded, and that require pausing write operations until the snapshot is created. Further, even "space-efficient" snapshot solutions still require a significant amount of metadata. The disclosed embodiments provide snapshots which exhibit lower amounts of storage required to store metadata than existing solutions.

Figure 1:
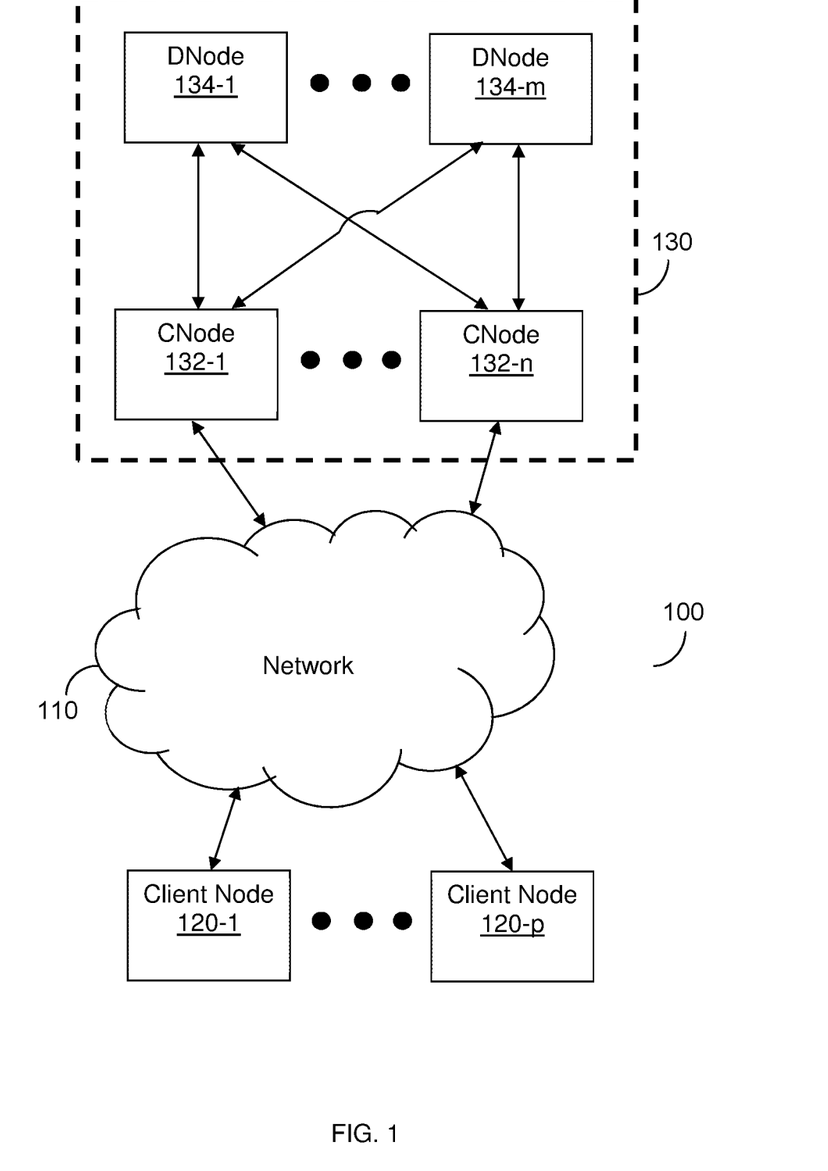
FIG. 1 is a network diagram illustrating a distributed storage system utilized according to various disclosed embodiments.

FIG. 1 is an example network diagram 100 illustrating a distributed storage system utilized according to various disclosed embodiments. The network diagram 100 includes a distributed storage system 130, a network 110, and client nodes 120-1 through 120-p (referred to as a client node 120 or as client nodes 120 for simplicity).

The distributed storage system 130 includes compute nodes 132-1 through 132-n (referred to as a CNode 132 or as CNodes 132 for simplicity) and storage nodes (DNodes) 134-1 through 134-m (referred to as a DNode 134 or as DNodes 134 for simplicity). The distributed storage system 130 may be configured as described further in U.S. patent application Ser. No. 16/002,676, assigned to the common assignee, the contents of which are hereby incorporated by reference.

The network 110 may be, but is not limited to, a wireless, cellular or wired network, a local area network (LAN), a wide area network (WAN), a metro area network (MAN), the Internet, the worldwide web (WWW), similar networks, and any combination thereof. The client node 120 may be, but is not limited to, a server, a personal computer, a laptop, a tablet computer, a smartphone, or any other device configured to store data, access data, or both.

The DNodes 134 may be realized as combinations of volatile (e.g., RAM) and non-volatile (e.g., Flash, 3D Xpoint) memories. The non-volatile memories may be included in, for example, hard-disk drives (HDDs), solid state drives (SSDs), or a combination thereof.

The CNodes 132 are configured to translate access commands into formats supported by the DNodes 134. Example protocols supported via translation by the CNodes 132 may include, but are not limited to, Block protocols, Network Attached System protocols [e.g., Network File System (NFS) protocol, Server Message Block (SMB) protocol, etc.], Object Store protocols [e.g., Simple Storage Service (S3) protocol], Key Value Store protocol, and the like. Because the CNodes 132 are configured to translate access commands into a format that is supported by the protocol of the DNodes 134, support for new protocols may be added by configuring the CNodes 132 with translation rules for the new protocols. The translation rules may include rules for converting access commands in a received format into a format that is compatible with the protocol supported by the DNodes 134.

The CNodes 132 collectively act as a distributed transaction manager for accessing data in the DNodes 134. As the CNodes 132 do not store the data to be accessed by client nodes or the metadata used for navigating to locations in the DNodes 134, such data and metadata do not need to be recovered when one or more of the CNodes 132 fails. Additionally, CNodes 132 may be added or removed without disrupting data stored in the storage system 130. An example schematic diagram of a CNode 132 is described below with respect to FIG. 4.

The client node 120 is configured to send access commands to the distributed storage system 130 via the network 110. The CNodes 132 are configured to receive access commands from the client nodes 120 and to access the DNodes 134 based on the received commands. The access may include translating the received commands into a format supported by the DNodes 134. As shown in FIG. 1, each CNode 132 may access all DNodes 134. As a non-limiting example, NVM Express (NVMe) over Fabrics may be utilized to enable such access.

Figure 2:
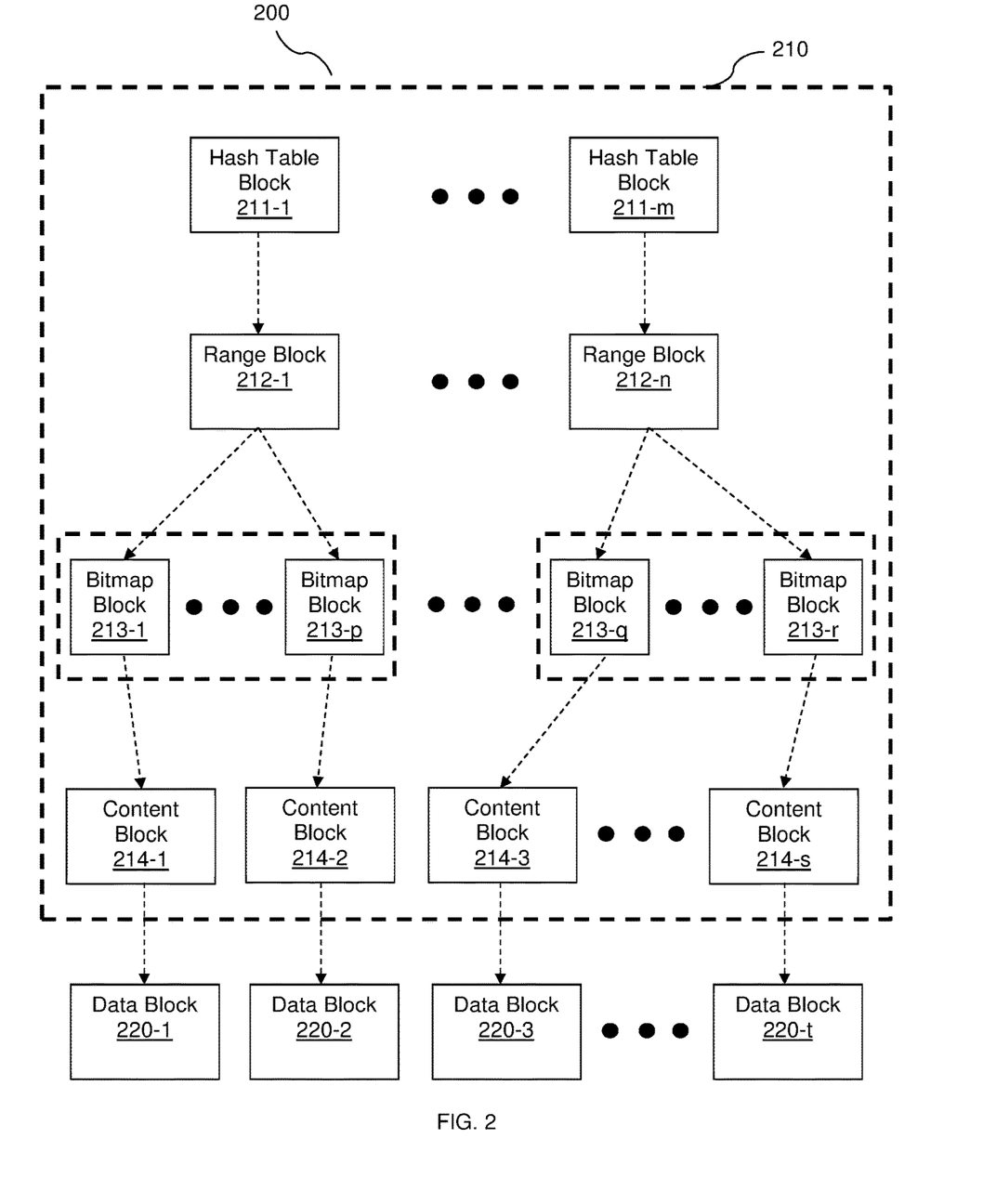
FIG. 2 is a virtualization model including bitmap blocks utilized according to various disclosed embodiments.

The access may include navigating element trees stored in the DNodes 134 (e.g., the element trees of the element store 210, FIG. 2) to access data in data blocks stored in the DNodes 134 (e.g., the data blocks 220, FIG. 2). The CNodes 132 are configured to navigate the element trees to read the data blocks 220 and to modify the element trees by, for example, splitting blocks, merging blocks, and the like. To this end, the CNodes 132 may be configured to allocate new blocks, write data to blocks, read data from blocks, add and remove pointers in blocks, and the like.

Each element tree is a tree of metadata blocks that represents an element, for example as described further below with respect to FIG. 2. An element is a persistent metadata structure that is remote from the CNodes 132 and is used to access the metadata. Each element includes at least an attribute store (not shown) including metadata blocks storing attributes. Each attribute has a key and corresponding value. The attributes may include different types of values such as, but not limited to, identifiers (i.e., pointers to other locations), size, time of last access, access control lists (ACLs), application-specific uses (e.g., identifying an object for S3), and the like. Once created, the elements allow for reading of the data blocks regardless of the protocol of the command which triggered its creation, for example, a S3 write request may trigger creation of an element for the data blocks while the data blocks can be read based on a NFS read request.

At least some of the attributes are pointers to other locations. A pointer attribute may have a <key,value> of <name,identifier>, where the identifier is either a handle of an element or an identifier of a physical location in one of the DNodes 134. Each metadata block may have multiple pointers, at least some of which point to other metadata blocks, thereby creating a tree or buckets. A pointer attribute that acts as a pointer to another metadata block is a link, which allows for navigation among metadata blocks for an element. The metadata block that is pointed to by a link may be stored in another device (e.g., in a device of a different DNode 134).

In some implementations, one or more of the metadata blocks may store an immediate value rather than a pointer to a location in the DNodes 134. The immediate value includes data that would otherwise be stored in the data blocks 220, FIG. 2. As a non-limiting example, the data blocks may be stored in a metadata block when the size of the data block is less than 1 kilobyte.

Each element may further include an element data store (not shown) allowing for read and write operations of data to the element. Whether the element includes an element data store may depend on the type of the element. As a non-limiting example, a file may have an element data store. The element data store may be thinly provisioned with byte granularity such that the number of bytes written to the element data store is the number of bytes used.

At least a portion of the data blocks may be temporarily included in the elements and stored in, for example, 3D Xpoint memory of the DNodes 134 before being migrated from the 3D Xpoint memory to Flash memory of the DNodes 134. When the data is migrated to the Flash memory, the pointers of the elements which had stored the migrated data may be updated to point to the location of the migrated data in the Flash memory. The temporary storage of the data blocks allows for manipulating the data blocks (e.g., via encoding, data reduction, etc.) in the 3D Xpoint memory before migrating the data blocks to the Flash memory.

In an embodiment, the CNodes 132 are configured to perform snapline-related operations that involve interacting with snaplines. To this end, such operations may include, but are not limited to, creating snaplines, deleting snaplines, writing to snaplines, reading from snaplines, creating snapshots based on snaplines, and writing to snapshots. Each snapline represents metadata pointers in the storage system 130 at a point in time and point to offset ranges such that the snaplines can be utilized to create snapshots of portions of the storage system 130 at previous times. The times at which snaplines are created are indicated based on a global counter that is consistent across the CNodes 132. The global counter is updated periodically. Each snapline therefore represents any updates to metadata in the storage system 130 that occurred around the same time as indicated by updates having the same global counter.

Creating a snapline includes storing a timestamp and a status of each offset range in the DNodes 134 in a bitmap block (e.g., one of the bitmap blocks 213, FIG. 2). The snapline is associated with a time of the global counter at which the snapline was created. In a further embodiment, to ensure crash consistency in the storage system 130, write acknowledgments by the CNodes 132 are paused during creation of a new snapline such that dependent writes are not included in any snaplines in which their dependencies are not included. In an example implementation, snaplines are created periodically, for example every second.

Figure 3:
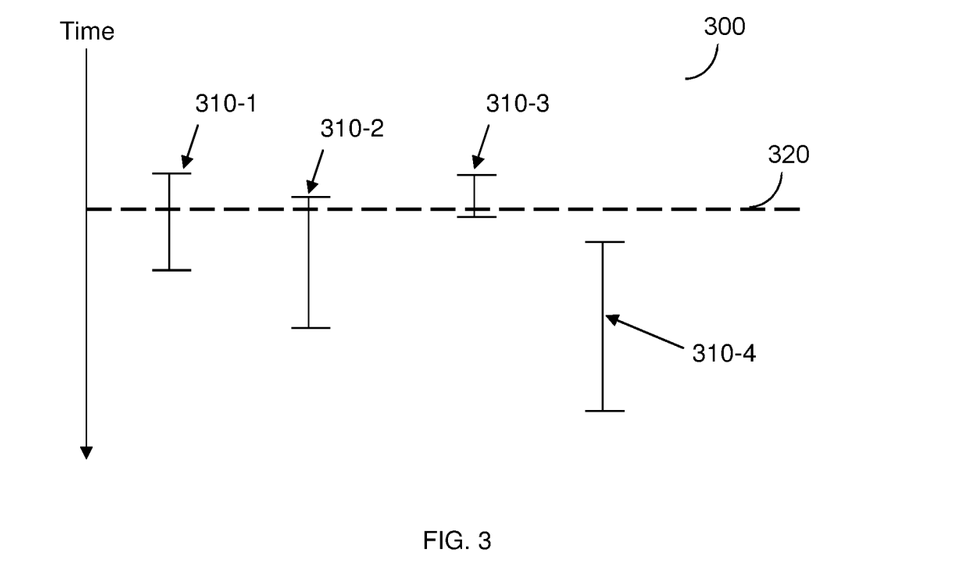
FIG. 3 is a time-write diagram utilized to describe independent and dependent writes.

FIG. 3 is an example time-write diagram 300 utilized to describe dependent and independent writes and, in particular, providing crash consistency with respect to dependent writes. In the example time-write diagram 300, durations of time for writes 310-1, 310-2, 310-3, and 310-4 are visually represented. Each visual representation of a write 310 has a start and an end, where the start represents a time at which a write request is received and the end represents a time at which the write is acknowledged.

The duration of time for the write 310-1 overlaps with the duration of time of each of the writes 310-2, 310-3, and 310-4. Thus, write 310-1 is independent with respect to each of writes 310-2, 310-3, and 310-4. Likewise, write 310-2 is independent with respect to each of writes 310-1, 310-3, and 310-4. The durations of time for writes 310-3 and 310-4 do not overlap and, therefore, writes 310-3 and 310-4 are dependent. Specifically, in the example time-write diagram shown in FIG. 3, write 310-4 is dependent on write 310-3 such that, under normal circumstances, write 310-3 would need to be included in any snapshots in which write 310-4 appears.

In the event of a system crash, a snapshot may be used to restore data lost during the crash. In distributed storage systems, nodes performing write-related operations may operate independently, thereby leading to a high likelihood that multiple writes are received in parallel. To ensure crash consistency with respect to snapshots, a snapshot including a first write that is dependent on a second write must also include the second write. In the example diagram 300, the write 310-4 is dependent on the write 310-3 such that any snapshot including write 310-4 must also include write 310-3 to be consistent.

It has been identified that distributed storage systems do not have "perfect" clocks that are uniform across different nodes. Specifically, different clocks in a distributed storage system may have drift, i.e., some minor differences in time. Thus, organizing writes with respect to time in order to ensure consistency for snapshots may result in errors as a result of these differences.

In an embodiment, the possibility that dependent writes will not appear as needed in the same snapshot is avoided by maintaining a prefix tree. Each element in the storage system may be assigned a prefix identifier derived from its ancestors, i.e., other elements that were already in the storage system when the element was created or modified. The prefix identifiers may be assigned such that the identifier is longer depending on the depth of the element within an element tree of the storage system. Relationships among elements in the element tree may be confirmed by performing comparisons among prefix identifiers. Thus, to detect if an element is part of a snapshot, a search within the prefix tree is performed.

As a non-limiting example for prefix identifiers, a root element (i.e., the earliest element) may allocate 1-byte identifiers to each of its children (e.g., the identifiers may be 1, 2, 3, etc.). Child 2 may allocate 2-byte identifiers to each of its children (e.g., the identifiers may be 2.1, 2.2, 2.3, etc.). Child 2.2 may allocate 3-byte identifiers to each of its children (e.g., the identifiers may be 2.2.1, 2.2.2, 2.2.3, etc.). Different byte allocations may be used, for example, as needed as the number of children of an element increases. As a non-limiting example, child 2.3 may allocate 4-byte identifiers (e.g., the identifiers may include 2.3.255.1, 2.3.255.2, etc.).

To avoid prefix identifiers becoming excessively long, in some implementations, routing elements may be designated. Children of each routing element may be local to that routing element. When searching the prefix tree, the routing elements are used to resolve the search. Additionally, when portions of the element tree are modified (for example, when sub-trees are moved), the prefix identifiers may cease being correct. To this end, in an embodiment, a list of historical rename operations that are performed may be maintained. When resolving prefix identifiers, the list of rename operations may be compared to the prefix identifiers to ensure accuracy of the dependencies. To reduce the size of the rename operations list, prefix identifiers of the elements may be corrected based on the rename operations list such that at least some of the historical rename operations may be removed from the list while ensuring accuracy.

In another embodiment, the possibility that dependent writes will not appear as needed in the same snapshot is avoided by pausing write acknowledgments when writes are received during overlapping timeframes. To this end, in an embodiment, compute nodes (i.e., nodes configured for snapshot and snapline operations) in a storage system are instructed to stop answering writes until a new snapline is created. During this time, writes may still be performed but are not acknowledged. Once the new snapline has been created, each compute node is instructed to resume acknowledging writes. Pausing write acknowledgment provides a window of time in which to make time durations for dependent writes overlap such that the dependent writes effectively become independent of each other.

With respect to the example diagram 300, during the period of time in which write acknowledgments are paused, any of writes 310-1 through 310-4 that were already completed and acknowledged when creation of a new snapline begins are included in the new snapline. In the example diagram 300, creation of a new snapline begins at time 320 such that none of the writes 310-1 through 310-4 have been acknowledged before creation of this new snapline begins. When creation of the new snapline is completed, the compute nodes are instructed to resume acknowledging writes such that the writes 310-1 through 310-4 are acknowledged. The newly acknowledged writes 310-1 through 310-4 will all be included in the next snapline to be created such that a dependent write (i.e., the write 310-4) will not be included in any snapshots that do not also include its dependency (i.e., the write 310-3).

Another challenge faced by distributed storage systems with respect to parallel writes is that, when the number of nodes is high (e.g., 10,000 nodes), waiting for acknowledgment for a write from all nodes before allowing the nodes to resume acknowledging other writes can cause significant delays across the system if any of the nodes fail or become stuck. To this end, the disclosed embodiments provide solutions for preventing delays.

In an embodiment, delays may be reduced or prevented by synchronizing clocks among compute nodes in the storage system via the global counter. To this end, the global counter is maintained in one of the storage nodes, and all compute nodes are configured to read the global counter from the same storage node when needed. In an example implementation, the global counter may be read using, for example, remote direct memory access (RDMA) to allow for low latency when reading. Accordingly, all compute nodes use the same time by virtue of reading from the same global counter and no two-phase commit is needed. In another embodiment, compute nodes in the storage system are configured to rely on clocks in the compute nodes. Since the clocks may not be perfectly uniform, write acknowledgment by the other nodes is paused based on a maximum drift between any of the clocks. In such an embodiment, the clocks must be synchronized periodically.

Returning to FIG. 1, the CNodes 132 are also configured to delete snaplines. In an embodiment, deleting a snapline includes merging the snapline into the next snapline in time order to preserve its information. The merging of snaplines includes applying an "OR" operator with respect to statuses of the offset ranges such that the status of an offset is "written to" if either or both snaplines indicate that data is written at that offset and the status of an offset is "not written to" when neither snapline indicates that data is written at that offset. Thus, if two or more writes are taken at the same offset as indicated in different snaplines, the more recent write is indicated in the merged snapline.

In an embodiment, deleting a snapline does not require scanning all bitmap data structures (e.g., the bitmap blocks 213, FIG. 2). A snapline index may be maintained. The snapline index indexes snaplines that have since been overwritten. To this end, the snapline index includes an index of metadata in each snapline and metadata of a snapline that each snapline after the first snapline overwrites. If multiple previous snaplines have been overwritten by an overwriting snapline, the snapline index may indicate the newest snapline that has been overwritten by the overwriting snapline. The snapline indices allow for only reading from relevant bitmap data structures rather than scanning all such data structures. Further, when merging a snapline, the snapline index may be updated with respect to the merged snapline.

Figure 4:
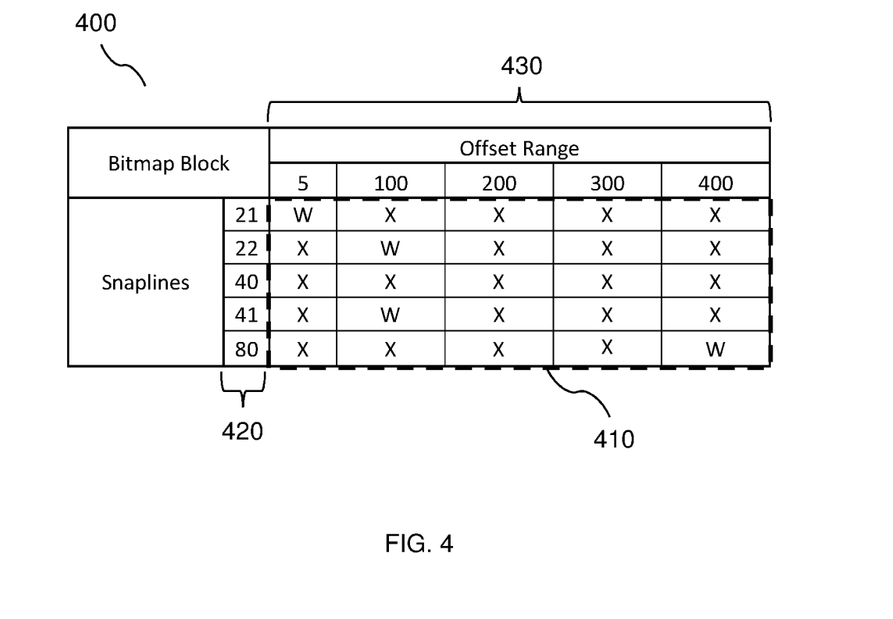
FIG. 4 is a contents diagram illustrating contents of a bitmap block utilized according to an embodiment.

FIG. 4 is an example contents diagram 400 representing contents of a bitmap block utilized according to an embodiment. The bitmap block includes status markers 410 (represented as "W" for "written to" and "X" for "not written to," respectively), snaplines 420 (represented as numerical identifiers "21," "22," "40," "41," and "80," respectively), and offset ranges 430 (represented as numerical values indicating the beginning of each offset range with respect to bits of a storage system). In an example implementation, the numerical identifier of each of the snaplines 20 represents a global time (i.e., a time with respect to a global counter used throughout different portions of the storage system) at which the respective snapline was created. For example, the global counter may be updated every second such that snapline 21 may represent a state of metadata in the storage system after the $21^{st}$ second since the first snapline was created.

The status markers 410 indicate whether different offset ranges 430 of the storage system were written to at a time associated with each of the snaplines 420. In the example contents diagram 400, the snapline labeled as 21 is written to at the offset range beginning with bit 5 but not in the other offset ranges indicated therein.

As an example for merging snaplines, the snaplines 21 and 22 among the snaplines 420 may be merged. The contents of snaplines 21 and 22 as compared to the merged result is shown in Table 1 below:

TABLE 1

|  |  | Offset Range | | | | |
|---|---|---|---|---|---|---|
| Bitmap Block |  | 5 | 100 | 200 | 300 | 400 |
| Snaplines | 21 | W | X | $W_{21}$ | X | X |
|  | 22 | X | W | $W_{22}$ | X | X |
|  | 21 + 22 (Merged) | W | W | $W_{22}$ | X | X |

As seen in table 1, the merge result for snaplines 21 and 22 indicates that data is written at offsets 5, 100, and 200. Further, the merged result at offset 200 illustratively represents that the data from snapline 22, i.e., the later snapline, is kept as the written data.

Returning to FIG. 1, in an example implementation, snaplines may be periodically deleted based on a sampling scheme such that the total number of snaplines does not change over time (i.e., when one snapline is added, another is removed at some point) but snaplines are not maintained based solely on a last-in-first out scheme. The sampling scheme may designate periods of time to be represented by each snapline and may allow for more frequent snaplines during more recent time periods (e.g., retain all snaplines created within the past five minutes and only retain select snaplines that are older than five minutes). For some implementations, high granularity (e.g., second granularity) may be desirable for recently created snaplines but may be less important over time (e.g., a week after snaplines were created) such that a snapline captured during a longer period of time may sufficiently represent older statuses of metadata in the storage system. To this end, the times at which remaining snaplines were created may be farther apart.

As a non-limiting example of a sampling scheme, such a sampling scheme may provide for maintaining one snapshot for a snapline created during a previous week, one snapshot for a snapline created during a day of the current week prior to the current day, one snapshot for snaplines created each past hour of the current day, one snapshot for a snapline created during the first 55 minutes of the past hour, and a snapshot for each snapline created every second of the past 5 minutes. In such an example, a snapline may be created once per second but deleted or retained according to the sampling scheme.

The CNodes 132 are also configured to read from the snaplines. In an example implementation described further with respect to FIG. 2, reading a snapline includes reading a particular offset range given a handle for a portion of data (e.g., a file or object). To this end, the handle is used to navigate through hash table blocks, range blocks, and then to bitmap blocks. At the bitmap block, a most recent write in its history at the respective offset range is identified. Once the most recent write is identified, a corresponding portion of content blocks is identified which, in turn, is used to navigate to the actual portion of data sought. Thus, the snaplines may be incorporated into metadata pointers of the storage system 130 while allowing for reading contents normally.

The CNodes 132 are also configured to create snapshots, also known as clones. A snapshot is created based on a time reference and a location reference. Each snapshot is a clone represented by a snapline in the storage system from a particular time with respect to the global counter used for timestamps of the snaplines. When a snapshot is read, data from the time of its respective snapline (or, if no data was written at that time, the most recent data written before that time) may be returned. In an example implementation, each snapshot is a clone of all snaplines from a bitmap block at the time. Snapshots may be read when a state of the bitmap block at a particular time is desired.

In an embodiment, creating a snapshot includes marking a snapline associated with a desired time as non-erasable such that the snapline is not to be deleted. The snapshot is a pointer to a snapline to be preserved and the sub-directory that snapline refers to.

In a further embodiment, snapshots may be created for portions of filesystems rather than for entire filesystems. In such an embodiment, a snapshot is created such that the snapshot indicates a portion of the storage system identified by one or more prefix identifiers as described herein. When the snapshot is read, a prefix tree of the storage system is used to determine which elements (and, therefore, which corresponding data) are included in the snapshot.

In an embodiment, snapshot may be written to such that a snapshot may diverge from a current set of snaplines. To this end, the CNodes 132 are configured to create writeable snapshots and to write to such writeable snapshots. Such a writeable snapshot includes a pointer to a snapline among the current snaplines in the bitmap block that is associated with the time at which the writeable snapshot was created (i.e., cloned) based on the snaplines in the bitmap block at that time. To differentiate between snapshots created for the same time (i.e., snapshots represented by snaplines having the same global counter time), each offset is associated with a clone identifier of its respective snapshot.

FIG. 2 is an example virtualization model 200 including bitmap blocks utilized according to various disclosed embodiments. The virtualization model 200 includes an element store 210 and data blocks 220. The element store 210 includes element trees of metadata blocks. The metadata blocks at the bottom level of the element store 210 point to the data blocks 220, which are locations in a physical storage. In an embodiment, the metadata blocks include hash table blocks 211, range blocks 212, bitmap blocks 213, and content blocks 214. The data blocks 220 are included in a data store (not shown).

In the example virtualization model 200, each element tree has a respective hash table block 211-1 through 211-$m$ at its top level. Each hash table block 211 may point to one or more range blocks 212, each of which in turn points to a range of bitmap blocks 213. Each bitmap block 213 points to one or more content blocks 214, thereby forming a tree made up of a hash table block 211, range blocks 212, bitmap blocks 213, and content blocks 214. Additional blocks may be added on demand, for example as files are written or additional elements are created.

In an embodiment, the top level of the element store 210 includes the respective hash table blocks 211 of all elements. Each hash table block 211 includes a handle that is a unique identifier of its respective element and points to a range block 212. The hash table blocks further include global information such as latest attributes from the element, a locks list (i.e., identifying locks on blocks of the element's respective tree), or both.

The hash table blocks 211 collectively provide for use of a hash table including composite blocks for each element as buckets of the hash table. Specifically, each composite block of a hash table includes a hash table block 211 and its child blocks (e.g., range blocks 212 and bitmap blocks 213).

The hash table may be maintained as a consistent hash table by balancing portions of the hash table among storage nodes (e.g., the DNodes 134, FIG. 1) such that the storage nodes store equal portions of the hash table. When memory devices (e.g., 3D Xpoint devices) storing the hash table are added or removed, the hash table may be balanced among the remaining memory devices. The hash table includes the root of each element.

The range blocks 212 point to the bitmap blocks 213 using offset ranges such that each range block 212 points to one or more offset ranges that each include multiple bitmap blocks 213. When there are more bitmap blocks than there are available range block pointers for a first range block 212, a second range block 212 may be a child of the same hash table block 211 and point to a second range of the bitmap blocks 213. The range blocks 212 allow the element store 210 to have a high span out, i.e., a large number of children per block, because the range blocks can each point to a high number of child blocks. Further, each range block 212 may point to another range block 212 instead of or in addition to any of the bitmap blocks 213, thereby allowing the element store 210 to grow indefinitely as its respective element grows.

In an embodiment, each range block 212 is a container including tuples such as ranges and pointers, where each tuple describes a pointer to a child block. Each range may point to a location of a child block (e.g., an address of one of the bitmap blocks 213). The ranges may be, for example, byte ranges. As a non-limiting example, a 4-kilobyte range block can hold around 170 24-byte tuples and, therefore, can point to an equal amount (around 170) of children blocks.

In an embodiment, each bitmap block 213 is a container including tuples such as timestamps, data identifiers, and pointers. The timestamp is based on a consistent global (i.e., system-wide) counter that increments over time. The counter may advance, for example, at fixed intervals, each time a user request is received (e.g., a request to access data), and the like. The timestamps allow for creating snapshots of past versions of the element trees by correlating snaplines of specific times with the relevant timestamps. The data identifiers define which parts of data the bitmap block relates to, and the pointers are to respective child blocks (e.g., content blocks 214). In an embodiment, the data identifiers of a bitmap block 213 may include both a normal hash and a lowercase hash mapped to the normal hash. This allows for case insensitive lookup, i.e., the lowercase form of the hash may be found regardless of the pre-hash identifier. Each bitmap block 213 may be assigned a sequence number token based on its timestamp relative to other timestamps to allow for efficient comparisons of order when orders for acting on bitmap blocks must be determined (e.g., when multiple bitmap blocks are to be locked, they may be locked in order from earliest to latest).

In some implementations, the bitmap block 213 tuples may further include clone identifiers that are assigned to snapshots from different points in time. The clone identifiers allow for creating writeable copies, also referred to as clones or snapshots, of elements from different points in time.

In an embodiment, updating the global counter includes creating a snapline for the element store 210 based on the bitmap blocks 213. Each snapline indicates contents of a portion of the metadata blocks at a point in time. The portion may include blocks of one or more elements. Because of the persistent nature of the metadata blocks, data of previous versions of the blocks are maintained when updated to add new data. The snaplines allow for efficiently reading block contents from different points in time.

The content blocks 214 include pointers to the data blocks 220. The content blocks 214 provide horizontal views of the respective snaplines that allow for efficient reading of the snaplines. Each of the content blocks 214 includes a range for a respective location in physical data and may be shared among different elements. Accordingly, the content blocks 214 further include element identifiers indicating which elements each content block 214 belongs to. In an example implementation, because the content blocks 214 consume more space than other blocks 211 through 213, the content blocks may be stored on Flash while the other blocks 211 through 213 are stored on XPoint to reduce costs of storage.

Data is read from the data blocks 220 by navigating the metadata blocks using their respective pointers. In an embodiment, a handle of the element is read from the hash table blocks 211 and one or more corresponding range blocks 212 is determined. This includes computing a hash function based on the hash table including the hash table blocks 211. A relevant bitmap block 213 is identified by scanning the ranges of the determined range blocks 212. The identified bitmap block 213 is read in order to identify a content block 214. The identified content block 214 is read to obtain a location of a data block 220, i.e., a location in a physical layer of storage. The data is read from the data block 220. When some of the metadata blocks are included in a composite block, the navigation includes reading the composite block to identify the next block to read.

In an embodiment, to avoid deadlocks, blocks are locked in the following order when taking multiple locks: bitmap blocks 212, hash table blocks 211, allocation blocks (i.e., blocks stored in a buffer), and content blocks 214. In an optional embodiment, if locks on multiple elements must be taken, blocks of the elements may be locked from earliest to latest (e.g., as indicated by a sequence number of each element).

In an embodiment, different versions of the metadata blocks may be used for different kinds of data for elements. As an example, a first data version may be used for files and objects while a second name version may be used for directories and buckets. In this example, the data versions of the range blocks 212 contain data ranges, the date versions of the bitmap blocks 213 contain data ranges, and the data versions of the content blocks 214 contain data pointers, while the name versions of the range blocks 212 contain sorted text ranges, the name versions of the bitmap blocks 213 contain name hashes (e.g., for a directory the name bitmap block 213 may contain a hash of the name "abcd1234"), and the name versions of the content blocks 214 contain name pointers.

The tree 210 may grow and shrink as needed by splitting and merging blocks, respectively. This allows for dynamically adjusting the tree 210 to minimize wasted space due to empty metadata blocks. An example process for splitting blocks is described further in the above-referenced U.S. patent application Ser. No. 16/002,804, the contents of which are hereby incorporated by reference. The tree may shrink by merging when 2 or more blocks are sufficiently empty, for example when each of their contents are below a threshold total size. The merging may include writing data of the sufficiently empty blocks to a new merged block, deleting the sufficiently empty blocks, and updating their respective parents to point to the new merged block.

An example storage system and storage techniques utilizing storage virtualization according to the virtualization diagram 200 are described further in the above-referenced U.S. patent application Ser. No. 16/002,804, the contents of which are hereby incorporated by reference. More specifically, examples of hash tables as a top level of an element store and of a process for splitting blocks are described further in the Ser. No. 16/002,804 Application, the contents of which are hereby incorporated by reference.

It should be noted that the virtualization diagram 200 is merely an example. The disclosed embodiments may equally utilize other virtualizations that include data structures (e.g., the bitmap blocks 212) allowing for snaplines and snapshots as described herein.

Figure 5:
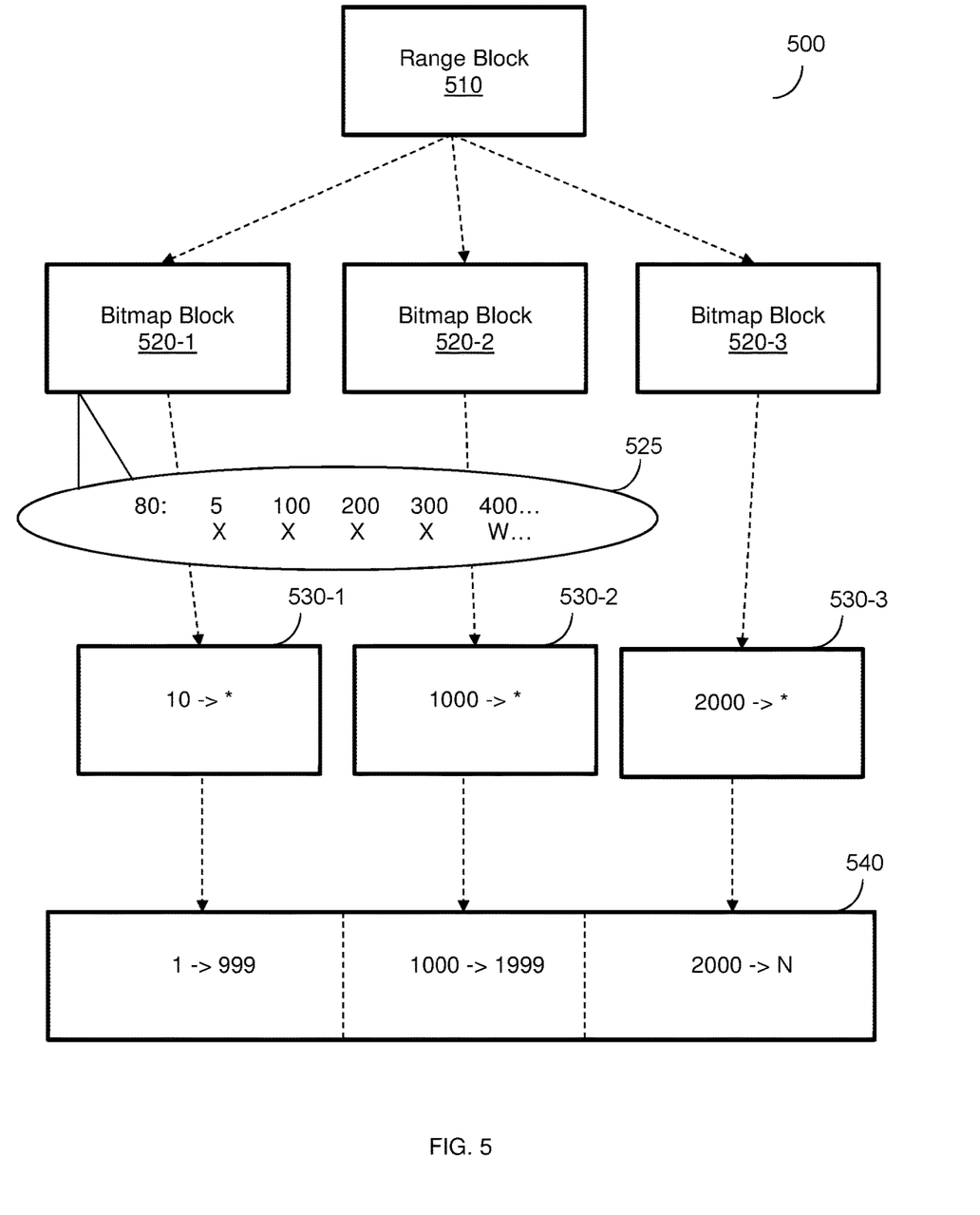
FIG. 5 is a pointers diagram utilized to describe various disclosed embodiments.

FIG. 5 is an example pointers diagram 500 utilized to describe various disclosed embodiments. The example pointers diagram 500 illustrates relationships among portions of a storage system represented by metadata pointers stored in the storage system. In the example pointers diagram 500, a range block 510 points to bitmap blocks 520-1 through 520-3. The bitmap blocks 520-1 through 520-3 point to respective content blocks 530-1 through 530-3. The content blocks 530-1 through 530-3, in turn, point to respective portions of the underlying data 540.

In the example pointers diagram 500, the bitmap block 520-1 includes metadata indicating offset ranges and corresponding status indicators. The metadata includes metadata portion 525, which indicates the offset ranges and corresponding status indicators for one of the snaplines 420 having a time marker of 80, FIG. 4. The offset ranges correspond to offset ranges in the underlying data 540 such that the metadata portion 525 indicates that the underlying data 540 at offset range 400 is written to. Accordingly, the bitmap block 520-1 maintains temporal data indicating the write states of various portions of the underlying data 540 for snaplines representing different times with respect to a system-wide global counter.

Figure 6:
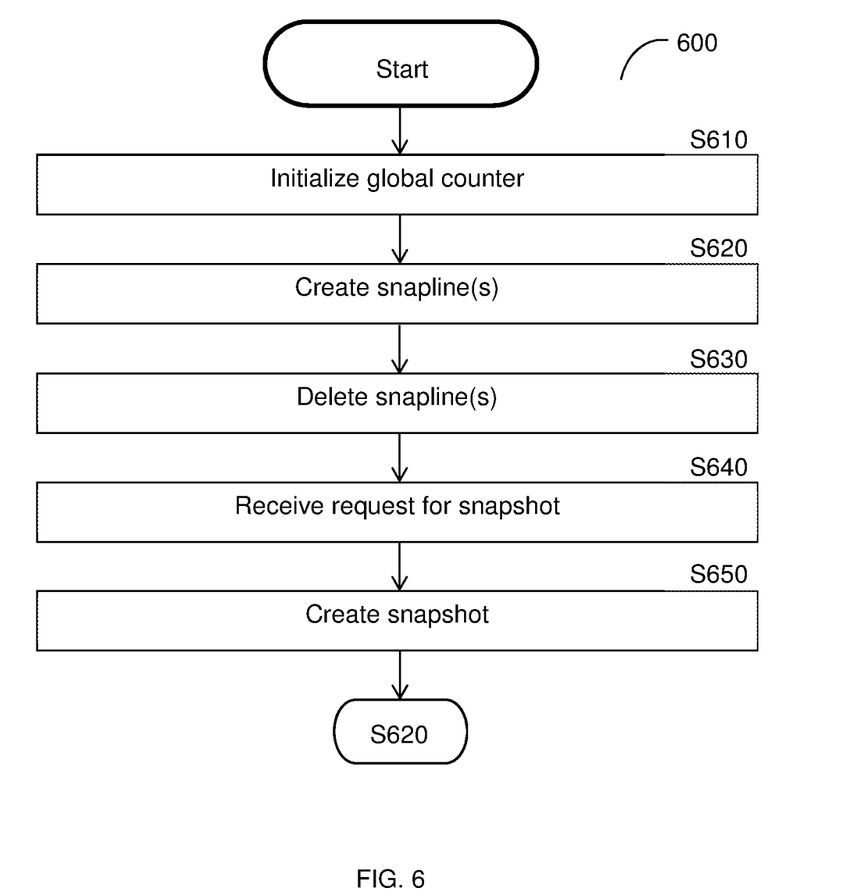
FIG. 6 is a flowchart illustrating a method for providing improved efficiency snapshots according to an embodiment.

FIG. 6 is a flowchart 600 illustrating a method for providing improved efficiency snapshots according to an embodiment. The method may be utilized to provide snapshots for a distributed storage system such as the distributed storage system 130, FIG. 1. To this end, compute nodes of the distributed storage system are configured to store bitmap data used for maintaining snaplines as described herein. In an example implementation, bitmap blocks are used to store the snaplines.

At S610, a global counter is initialized for all compute nodes in a storage system (e.g., the CNodes 132 of the distributed storage system 130, FIG. 1). The global counter is a variable used to provide a uniform time across the compute nodes with respect to snaplines created for the storage system. In an example implementation, the global counter is initialized as zero and increased in integer increments (e.g., 1, 2, 3, etc.). The global counter is updated, for example, at periodic intervals (e.g., every second). In an embodiment, updating the global counter includes incrementing the global counter and storing the current value of the global counter in one of the storage nodes in the storage system (e.g., one of the DNodes 134, FIG. 1).

At S620, snaplines are created. The snaplines may be created, for example, at periodic intervals as the global counter is updated (i.e., such that each snapline represents data in the storage system at the most recent time of the global counter). To this end, creating a snapline may include updating the global counter and recording snapline data including the current value of the global counter and status markers with corresponding offset ranges. Each status marker indicates whether the corresponding offset range is written to or not at the time represented by the updated global counter's value. Each snapline is created by one of the compute nodes in the storage system such that updating the global counter includes that compute node increasing the global counter's value and storing the increased value in one of the storage nodes.

In an embodiment, to ensure crash consistency for snapshots created using the snaplines, a single global counter is maintained based on remote direct memory access (RDMA). To this end, the global counter may be incremented and stored in one of the storage nodes. Incrementing the global counter includes storing a current value of the global counter as a timestamp of a snapline, where the current value increases each time metadata in the storage system is modified and a snapline is created for the modified metadata. In an example implementation, the incrementation may be first performed on NVRAM of the storage node and then on RAM of the storage node. In some implementations, if the value of the global counter is different in NVRAM than in RAM after a crash, the compute node performing the incrementing may correct the global counter accordingly. When the storage node becomes unavailable, a new storage node may be used to store the global counter. A RDMA read operation may be performed each time an input/output operation would modify the stored data to access the current global counter time and then the global counter is implemented via a write to the storage location of the global counter.

In the RDMA-based global counter implementation, the global counter is stored in a single location that may be read from any of the compute nodes when the global counter is needed, thereby ensuring that the time is consistent among the compute nodes at any point. Further, since maintaining the global counter only requires basic read and write operations, there is no two-phase commit or delayed input/output operations. Accordingly, this provides a robust yet simple process for ensuring crash consistency among storage nodes.

In an alternative embodiment, to ensure crash consistency for snapshots created using the snaplines, creating a new snapline includes pausing write acknowledgments while a new snapline is being created. This ensures that dependent writes are not included in any snaplines without also including their respective dependencies.

Figure 7:
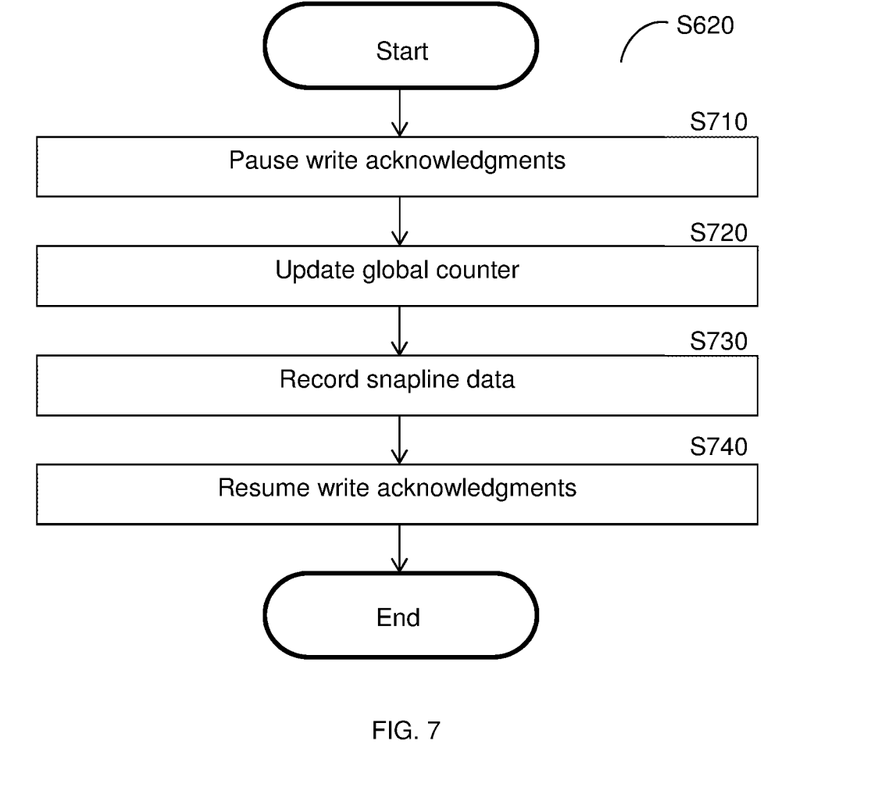
FIG. 7 is a flowchart illustrating a method for creating snaplines while ensuring crash consistency according to an embodiment.

FIG. 7 is a flowchart S620 illustrating a method for creating snaplines while ensuring crash consistency according to an embodiment. In an embodiment, a snapline is created by one of multiple compute nodes in a storage system. At S710, write acknowledgments are paused as creation of the snapline begins. S710 includes instructing all other nodes in the storage system to stop acknowledging writes. At S720, the global counter is updated. As noted above, new snaplines may be created and the global counter may be updated periodically, for example every second. At S730, snapline data including the value of the updated global counter and status markers for respective offset ranges are recorded. In an embodiment, the snapline data is recorded in a bitmap data structure such as the bitmap blocks 213, FIG. 2. At S740, when the snapline creation is finished, the other compute nodes are instructed to resume write acknowledgments.

Returning to FIG. 6, at optional S630, snaplines may be deleted. In an example implementation, the snaplines are deleted according to a sampling scheme such that the total number of snaplines maintained by the storage system remains constant over time. In other implementations, snaplines may be deleted according to different schemes. In an embodiment, the deleted snaplines do not include snaplines marked as non-erasable in previously created snapshots.

At S640, a request for a snapshot is received. The request indicates at least a time with respect to the global counter and may further include an indication of a portion of the storage system for which a snapshot is desired.

At S650, the snapshot is created based on the requested time and execution resumes with S620. Specifically, the snapshot indicates a snapline having a timestamp matching the requested time that is not to be erased.

Figure 8:
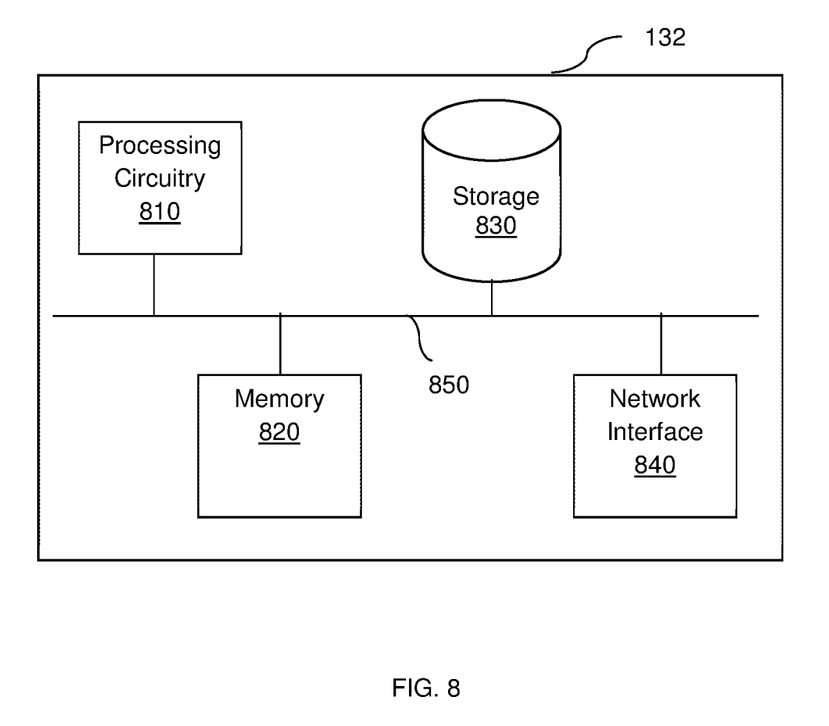
FIG. 8 is a schematic diagram of a compute node according to an embodiment.

FIG. 8 is a schematic diagram of a CNode 132 according to an embodiment. The CNode 132 includes a processing circuitry 810, a memory 820, a storage 830, and a network interface 840.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 820 may be volatile (e.g., RAM, etc.) memory. In an embodiment, the memory 820 is configured to store software for execution by the processing circuitry 810. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 810 to perform the various processes described herein.

The storage 830 may be magnetic storage, optical storage, and the like, and may be realized, for example, as flash memory or other non-volatile memory technology, CD-ROM, Digital Versatile Disks (DVDs), or any other non-transitory computer readable medium which can be used to store the desired information. The storage 830 may store the instructions for transfer to and storage in the memory 820 for execution by the processing circuitry 810.

The network interface 840 allows the CNode 132 to receive access commands and send data over the network 110, FIG. 1.

It should be understood that the embodiments described herein are not limited to CNodes having the specific architecture illustrated in FIG. 8, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for efficiently providing snapshots in storage systems, comprising:
    creating a plurality of snaplines for a storage system, each snapline having metadata including a timestamp and a status marker for each of a plurality of offset ranges, wherein each offset range corresponds to data stored in the storage system, the storage system including a plurality of compute nodes, wherein the timestamp of each snapline is a value of a global counter at a time of creation of the snapline, wherein the global counter is uniform among the plurality of compute nodes; and
    creating a snapshot based on the plurality of snaplines and a time value, wherein the snapshot indicates a snapline of the plurality of snaplines that is not to be deleted, wherein the timestamp of the snapline that is not to be deleted corresponds to the time value.

2. The method of claim 1, further comprising:
    deleting at least one snapline of the plurality of snaplines, wherein the created snapshot does not include any of the at least one deleted snapline.

3. The method of claim 2, wherein the at least one snapline is deleted such that a number of the plurality of snaplines remains substantially constant over time.

4. The method of claim 2, wherein the at least one deleted snapline is deleted according to a sampling scheme, wherein the sampling scheme defines frequency of deletion of snaplines with respect to times of creation of the plurality of snaplines.

5. The method of claim 2, wherein deleting the at least one snapline further comprises:
    merging each deleted snapline with another snapline of the plurality of snaplines.

6. The method of claim 1, wherein the storage system includes a plurality of storage nodes, further comprising:
    storing the value of the global counter in a first storage node of the plurality of storage nodes, wherein each compute node is configured to read the value of the global counter from the first storage node to determine a current value of the global counter when the compute node modifies the metadata in the storage system, wherein the global counter is incremented based on the determined current value.

7. The method of claim 1, wherein the snapshot is a writeable snapshot, wherein the writeable snapshot further includes a pointer to a snapline among the plurality of snaplines having a timestamp that corresponds to a time at which the writeable snapshot is created.

8. The method of claim 7, the storage system having a plurality of offsets, wherein an offset of the plurality of offsets is associated with a clone identifier for the snapshot, wherein the offset associated with the clone identifier is read when the snapshot is among a plurality of snapshots having the same timestamp.

9. The method of claim 1, wherein the storage system stores a plurality of elements and a plurality of prefix identifiers, wherein each element is a persistent metadata structure, wherein each prefix identifier is associated with one of the plurality of elements, further comprising:

reading the snapshot, wherein reading the snapshot includes determining, based on the prefix identifiers, whether each of the plurality of elements is included in the snapshot.

10. A non-transitory computer readable medium having stored thereon instructions for causing a processing circuitry to execute a process, the process comprising:

creating a plurality of snaplines for a storage system, each snapline having metadata including a timestamp and a status marker for each of a plurality of offset ranges, wherein each offset range corresponds to data stored in the storage system, the storage system including a plurality of compute nodes, wherein the timestamp of each snapline is a value of a global counter at a time of creation of the snapline, wherein the global counter is uniform among the plurality of compute nodes; and creating a snapshot based on the plurality of snaplines and a time value, wherein the snapshot indicates a snapline of the plurality of snaplines that is not to be deleted, wherein the timestamp of the snapline that is not to be deleted corresponds to the time value.

11. A system for efficiently providing snapshots in storage systems, comprising:

a processing circuitry; and a memory, the memory containing instructions that, when executed by the processing circuitry, configure the system to:

create a plurality of snaplines for a storage system, each snapline having metadata including a timestamp and a status marker for each of a plurality of offset ranges, wherein each offset range corresponds to data stored in the storage system, the storage system including a plurality of compute nodes, wherein the timestamp of each snapline is a value of a global counter at a time of creation of the snapline, wherein the global counter is uniform among the plurality of compute nodes; and create a snapshot based on the plurality of snaplines and a time value, wherein the snapshot indicates a snapline of the plurality of snaplines that is not to be deleted, wherein the timestamp of the snapline that is not to be deleted corresponds to the time value.

12. The system of claim 11, wherein the system is further configured to:

delete at least one snapline of the plurality of snaplines, wherein the created snapshot does not include any of the at least one deleted snapline.

13. The system of claim 12, wherein the at least one snapline is deleted such that a number of the plurality of snaplines remains substantially constant over time.

14. The system of claim 12, wherein the at least one deleted snapline is deleted according to a sampling scheme, wherein the sampling scheme defines frequency of deletion of snaplines with respect to times of creation of the plurality of snaplines.

15. The system of claim 12, wherein the system is further configured to:

merge each deleted snapline with another snapline of the plurality of snaplines.

16. The system of claim 11, wherein the storage system includes a plurality of storage nodes, wherein the system is further configured to:

store the value of the global counter in a first storage node of the plurality of storage nodes, wherein each compute node is configured to read the value of the global counter from the first storage node to determine a current value of the global counter when the compute node modifies the metadata in the storage system, wherein the global counter is incremented based on the determined current value.

17. The system of claim 11, wherein the snapshot is a writeable snapshot, wherein the writeable snapshot further includes a pointer to a snapline among the plurality of snaplines having a timestamp that corresponds to a time at which the writeable snapshot is created.

18. The system of claim 17, the storage system having a plurality of offsets, wherein an offset of the plurality of offsets is associated with a clone identifier for the snapshot, wherein the offset associated with the clone identifier is read when the snapshot is among a plurality of snapshots having the same timestamp.

19. The system of claim 11, wherein the storage system stores a plurality of elements and a plurality of prefix identifiers, wherein each element is a persistent metadata structure, wherein each prefix identifier is associated with one of the plurality of elements, further comprising:

reading the snapshot, wherein reading the snapshot includes determining, based on the prefix identifiers, whether each of the plurality of elements is included in the snapshot.

* * * * *